United States Patent [19]

Vierk et al.

[11] Patent Number: 5,680,921
[45] Date of Patent: Oct. 28, 1997

[54] TRANSMISSION BAND ASSEMBLY

[75] Inventors: David T. Vierk, Lansing; Anthony J. Grzesiak, Sauk Village, both of Ill.

[73] Assignee: Borg-Warner Automotive, Inc., Sterling Heights, Mich.

[21] Appl. No.: 598,196

[22] Filed: Feb. 7, 1996

[51] Int. Cl.$^6$ ............................................. F16D 65/06
[52] U.S. Cl. ........................... 192/107 T; 188/77 W; 188/259
[58] Field of Search ..................... 192/107 T, 80; 188/77 R, 77 W, 259

[56] References Cited

U.S. PATENT DOCUMENTS

| | | | |
|---|---|---|---|
| 1,704,963 | 3/1929 | Brey | 188/259 |
| 1,805,501 | 5/1931 | Tatter | 188/259 |
| 1,847,389 | 3/1932 | Fawick | 192/107 T X |
| 2,022,968 | 6/1935 | Fether | 188/259 X |
| 2,992,707 | 7/1961 | Lewis | 188/77 R |
| 3,429,766 | 2/1969 | Stormfeltz | 161/35 |
| 3,600,258 | 8/1971 | Morton | 161/42 |
| 3,639,197 | 2/1972 | Spain | 161/35 |
| 3,956,548 | 5/1976 | Kovac et al. | 428/64 |
| 4,049,103 | 9/1977 | Sessler | 192/107 T X |
| 4,291,794 | 9/1981 | Bauer | 192/107 |
| 4,384,640 | 5/1983 | Trainor et al. | 192/107 |
| 4,516,672 | 5/1985 | Caray | 192/107 |
| 4,552,259 | 11/1985 | Albertson | 192/107 |
| 4,595,450 | 6/1986 | Pike . | |
| 4,656,203 | 4/1987 | Parker | 523/155 |
| 4,700,823 | 10/1987 | Winckler | 192/107 |
| 4,715,486 | 12/1987 | Burdorf et al. | 192/107 |
| 4,727,972 | 3/1988 | Mueller | 192/107 |
| 4,907,677 | 3/1990 | Yamashita et al. | 188/73.1 |
| 4,923,045 | 5/1990 | Kobayashi et al. | 192/107 |
| 4,926,978 | 5/1990 | Shibata et al. | 188/73.1 |
| 4,951,793 | 8/1990 | Hays | 192/70.27 |
| 4,951,798 | 8/1990 | Knoess | 192/107 |
| 5,033,599 | 7/1991 | Hays | 192/70.27 |
| 5,092,443 | 3/1992 | Nomura | 192/107 |
| 5,125,482 | 6/1992 | Negishi | 188/73.38 |
| 5,127,504 | 7/1992 | Beccaris | 192/70.13 |
| 5,135,082 | 8/1992 | Umezawa et al. . | |
| 5,137,133 | 8/1992 | Graton et al. | 192/107 |
| 5,154,683 | 10/1992 | Phelps | 192/70.14 |
| 5,163,526 | 11/1992 | Morgun et al. | 188/250 |
| 5,167,312 | 12/1992 | Thirion de Briel et al. | 192/107 |
| 5,238,091 | 8/1993 | Nakagawa et al. | 188/77 W |
| 5,242,746 | 9/1993 | Bommier et al. | 428/252 |
| 5,288,683 | 2/1994 | Nakashima et al. | 148/413 |
| 5,305,864 | 4/1994 | Strohm | 192/107 |
| 5,323,882 | 6/1994 | Waterman et al. | 188/73.1 |

FOREIGN PATENT DOCUMENTS 63-297832  12/1988  Japan .

*Primary Examiner*—Richard M. Lorence
*Attorney, Agent, or Firm*—Emch, Schaffer et al; Greg Dziegielewski

[57] ABSTRACT

A transmission band assembly (10) having a circular band (12) and a friction material liner (26). The liner (26) varies in density at predetermined locations along its length to modify the torque curve of the transmission to provide smooth shifting.

4 Claims, 2 Drawing Sheets

TRANSMISSION BAND ASSEMBLY

BACKGROUND OF THE INVENTION

The present invention relates generally to a transmission band assembly. More specifically, the invention is directed to a circular transmission band having a friction material liner that varies in density at predetermined locations along the liner.

Automotive transmission bands are known in the art. These bands usually include a circular metal band having a liner affixed to the interior surface of the band. The liners are made from a variety of friction materials, such as asbestos, carbon, metal, ceramic and resin. In prior art assemblies, the friction material liners have a constant density along the entire length of the liner. It has been found that the prior art liners have not provided satisfactory transmission shift feel to drivers of vehicles in which the liners have been installed. For example, the prior art liners have caused vehicles to shudder under shifting. Therefore, there is a need for a transmission band assembly that provides satisfactory transmission shift feel.

The present invention satisfies the above-identified need. The transmission band assembly of the present invention includes, among other things, a friction material liner used in either a double or single wrap band in which the density of the liner is varied at various locations of the band to provide the desired shift feel. The varied density of the liner modifies the torque curve of the transmission to provide smooth shifting. The density can be varied gradually from one end of the liner to the other, or distinctly at certain locations, or distinctly on each segment. Density can be varied by thickness, friction material content, or basis weight.

SUMMARY OF THE INVENTION

The transmission band assembly of the present invention includes a substantially circular band having a leading edge and a trailing edge. The band defines an interior surface extending between the leading and trailing edges. A friction material liner extends along the interior surface of the band. The liner has a first end adjacent the leading edge, a second end adjacent the trailing edge and a middle portion extending between the first and second ends. The liner varies in density at predetermined locations along the liner.

It is the primary object of the present invention to provide a transmission band assembly having a friction material liner that provides satisfactory transmission shift feel.

Other objects and advantages of the present invention will become apparent to those skilled in the art upon a review of the following detailed description of the preferred embodiments and the accompanying drawings.

DETAILED DESCRIPTION OF THE PREFERRED EMBODIMENTS

Figure 1:
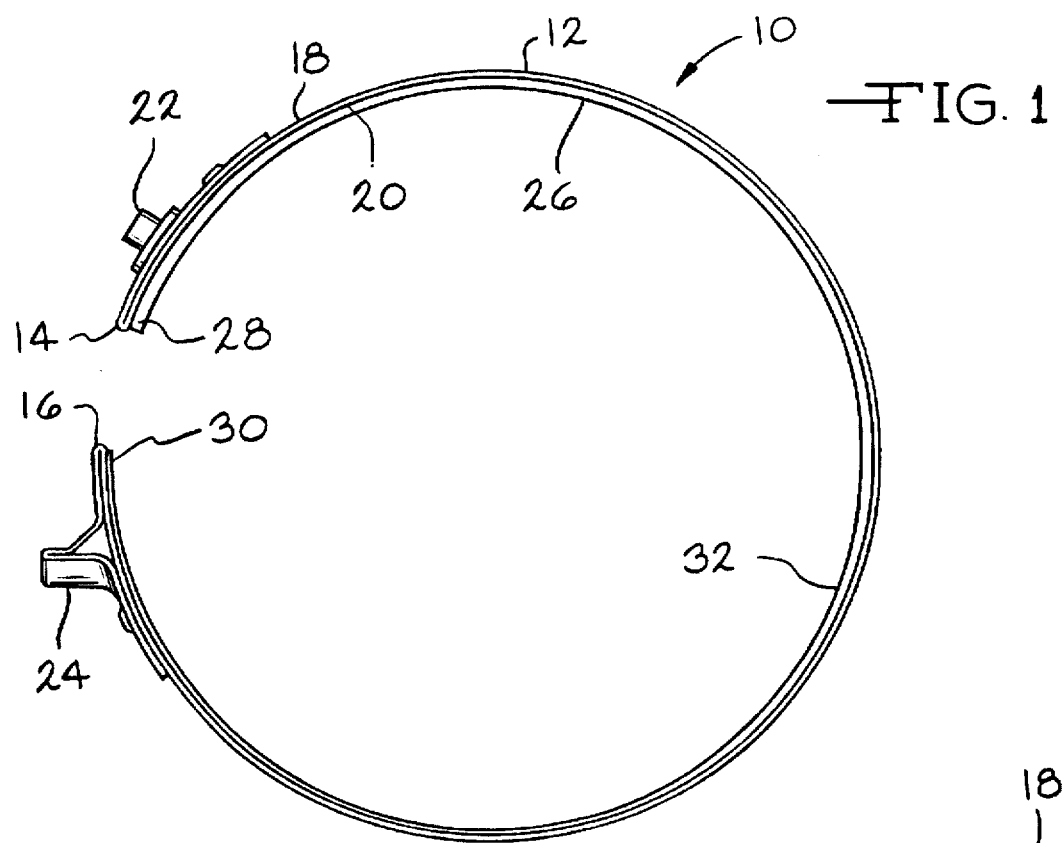
FIG. 1 is a front elevation view of a first embodiment of the transmission band assembly according to the present invention.
Figure 2:
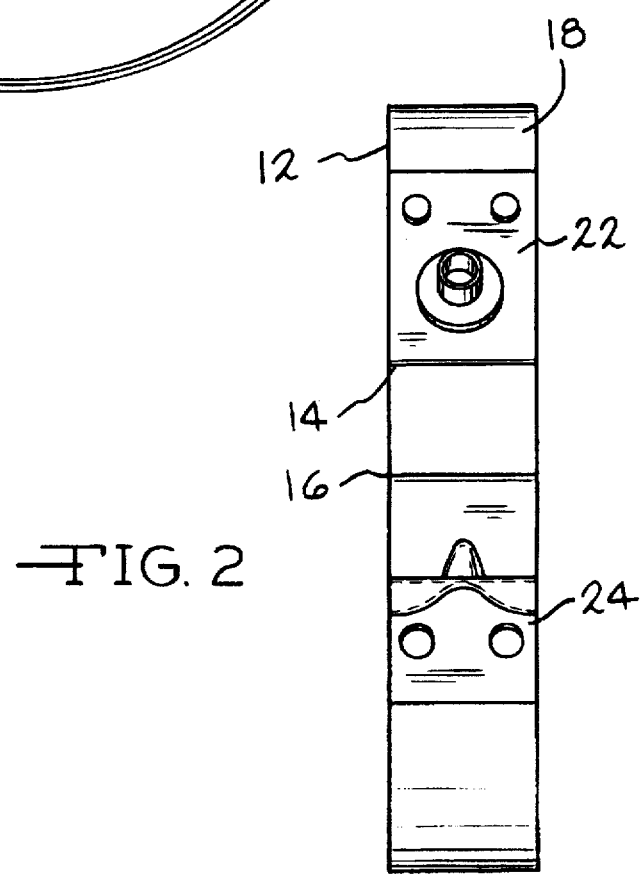
FIG. 2 is a side elevation view showing the leading and trailing edges of the transmission band assembly according to the present invention.

The preferred embodiments and best mode of the present invention will now be described in detail with reference to the drawings. The first embodiment of the transmission band assembly 10 is shown in FIGS. 1 and 2. The assembly 10 includes a substantially circular band 12 having a leading edge 14 and a trailing edge 16. The leading edge 14 is spaced from the trailing edge 16. The band 12 defines an exterior surface 18 and an interior surface 20. The surfaces 18 and 20 extend between the leading and trailing edges 14 and 16. As shown in FIGS. 1 and 2, mounting brackets 22 and 24 are positioned on the exterior surface 18. The band 12 and mounting brackets 22 and 24 are constructed of metal.

As shown in FIG. 1, a friction material liner 26 extends along the interior surface 20 of the band 12. The liner 26 has a first end 28 adjacent the leading edge 14, a second end 30 adjacent the trailing edge 16, and a middle portion 32 extending between the first and second ends 28 and 30. The liner 26 is made of friction material, which can consist of a variety of materials depending on the particular application for the assembly 10. Examples of friction materials that can be used in the present invention are found in U.S. Pat. No. 4,552,259, which is incorporated herein by reference. It has been found that friction materials that include phenolic resins are especially suitable in the present invention.

According to the present invention, the friction material liner 26 is varied in density at predetermined locations along the liner. The density can be varied gradually from one end to the other, or distinctly at certain locations, or distinctly on each segment. Density can be varied by thickness, resin content, or basis weight.

In the first embodiment of the present invention as shown in FIG. 1, the friction material liner 26 has a greater density at the first end 28 than at the second end 30. The liner 26 varies in thickness from a relatively thick portion at the first end 28 and tapers through the middle portion 32 to a relatively thin layer at the second end 30. The variation in the thickness of the liner 26 results in the variations in density.

Figure 3:
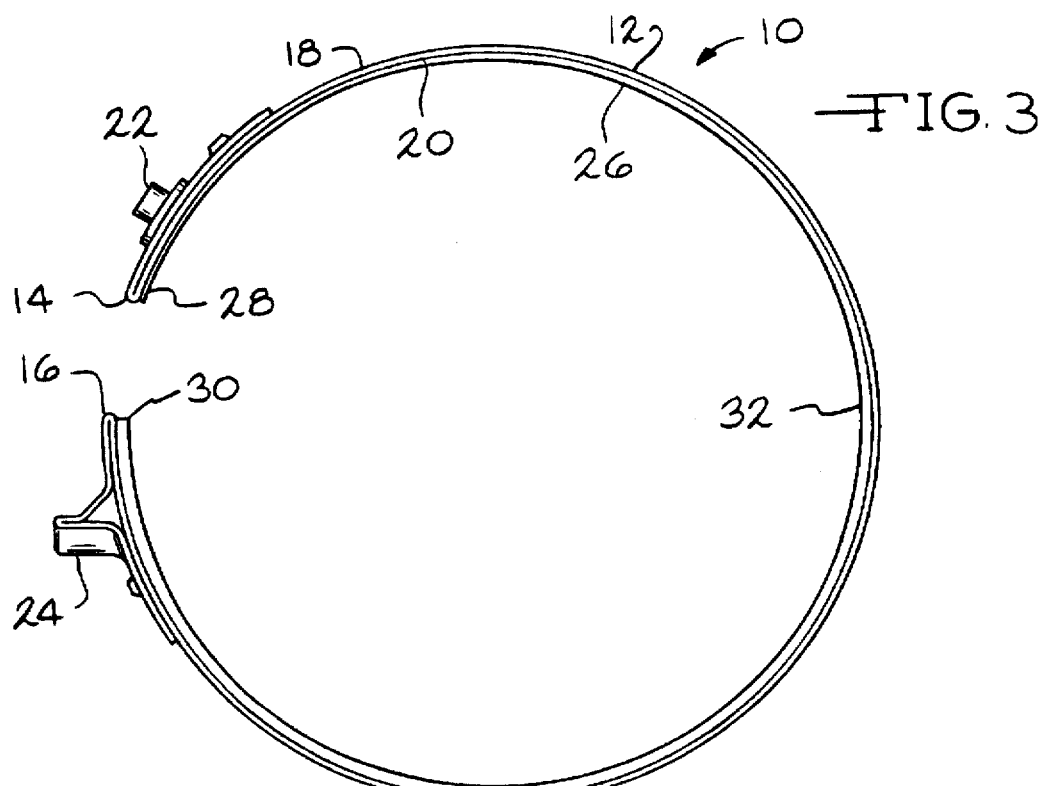
FIG. 3 is a front elevation view of a second embodiment of the transmission band assembly according to the present invention.

A second embodiment of the assembly 10 is shown in FIG. 3. The second embodiment includes all of the elements described above for the first embodiment. In the second embodiment, the friction material liner 26 has a greater density at the second end 30 than at the first end 28. As shown in FIG. 3, the liner 26 is relatively thick at the second end 30 and tapers through the middle portion 32 to a relatively thin layer at the first end 28.

Figure 4:
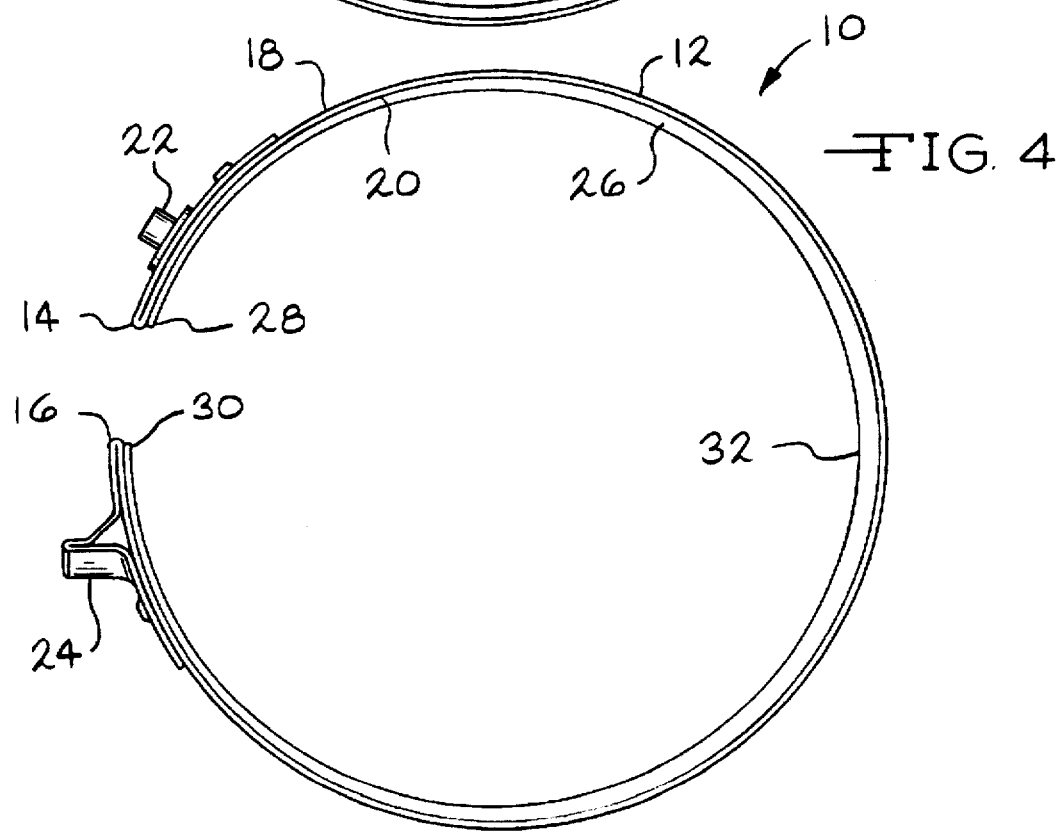
FIG. 4 is a front elevation view of a third embodiment of the transmission band assembly according to the present invention.

Referring to FIG. 4, a third embodiment of the assembly 10 is shown. The third embodiment includes all of the elements described for the first embodiment. In the third embodiment, the friction material liner 26 has a greater density at the middle portion 32 than at the first and second ends 28 and 30. As shown in FIG. 4, the variations in density are the result of the relative thickness of the liner 26 at the middle portion 32 as compared to the thickness of the liner 26 at the first and second ends 28 and 30.

It has been found that for each of the above-described embodiments the thickness of the liner 26 can be varied in the range from about 0.020 inch to about 0.050 inch, with the range of about 0.032 inch to about 0.042 inch being preferred.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, with the scope of the invention being defined solely by the appended claims.

We claim:

1. A transmission band assembly (10), comprising:

a substantially circular transmission band (12) having a leading edge (14) and a trailing edge (16), said band (12) defining an exterior surface (18) and an interior surface (20) extending between said leading and trailing edges (14, 16), a mounting bracket (24) being positioned on said exterior surface (18) adjacent said trailing edge (16), said band (12) being comprised of metal; and a friction material liner (26) extending along said interior surface (20), said liner (26) having a first end (28) adjacent said leading edge (14), a second end (30) adjacent said trailing edge (16) and a middle portion (32) extending between said first and second ends (28, 30), said liner (26) being comprised of a resinous material, said material being varied in thickness in a range from about 0.020 inch to about 0.050 inch at predetermined locations along said liner.

2. The invention of claim 1, wherein said liner (26) is thicker with respect to said band (12) at said first end (28) than at said second end (30).

3. The invention of claim 1, wherein said liner (26) is thicker with respect to said band (12) at said second end (30) than at said first end (28).

4. The invention of claim 1, wherein said liner (26) is thicker with respect to said band (12) at said middle portion (32) than at said first and second ends (28, 30).

* * * * *